United States Patent [19]

Thomas et al.

[11] Patent Number: 4,996,444
[45] Date of Patent: Feb. 26, 1991

[54] CLOCK RECOVERY CIRCUIT

[75] Inventors: Robert M. Thomas, Nepean; Joseph P. R. M. Pigeon, Ottawa, both of Canada

[73] Assignee: Northern Telecom Limited, Montreal, Canada

[21] Appl. No.: 410,376

[22] Filed: Sep. 21, 1989

[51] Int. Cl.$^5$ .......................... H03K 5/08; H04D 9/00
[52] U.S. Cl. .................................. 307/269; 328/164; 328/63; 307/139; 375/118
[58] Field of Search ................ 307/269, 139; 328/164, 328/63, 179; 375/97, 93, 106; 358/147, 148

[56] References Cited

U.S. PATENT DOCUMENTS

| | | | |
|---|---|---|---|
| 3,304,505 | 2/1967 | Pricer | 328/139 |
| 4,298,986 | 11/1981 | Hughes | 375/84 |
| 4,679,252 | 7/1987 | Holland | 307/269 X |
| 4,691,377 | 9/1987 | Yoshihara et al. | 375/97 X |
| 4,862,270 | 8/1989 | Nishio | 358/147 X |
| 4,929,849 | 5/1990 | Paul | 328/164 |

Primary Examiner—Stanley D. Miller
Assistant Examiner—Yen Nguyen
Attorney, Agent, or Firm—R. John Haley; Dallas F. Smith

[57] ABSTRACT

A clock recovery circuit includes a resonant circuit which is driven into oscillation at a clock frequency by binary 1 pulses in a data signal supplied thereto, a clock signal being derived from the resonant circuit via a buffer and a limiting amplifier. The resonant circuit has a high Q to accommodate long sequences of binary 0s during which it is not driven. In order to prevent overdriving when the data signal has a high density of binary 1s, a level detector detects when the oscillation amplitude exceeds a threshold level, whereupon a flip-flop is set to control a gate to inhibit driving of the resonant circuit until its oscillation amplitude has decayed. The flip-flop is clocked by the data signal to operate in synchronism with the incoming data, and may be followed by a second similarly clocked flip-flop to avoid potential errors.

6 Claims, 1 Drawing Sheet

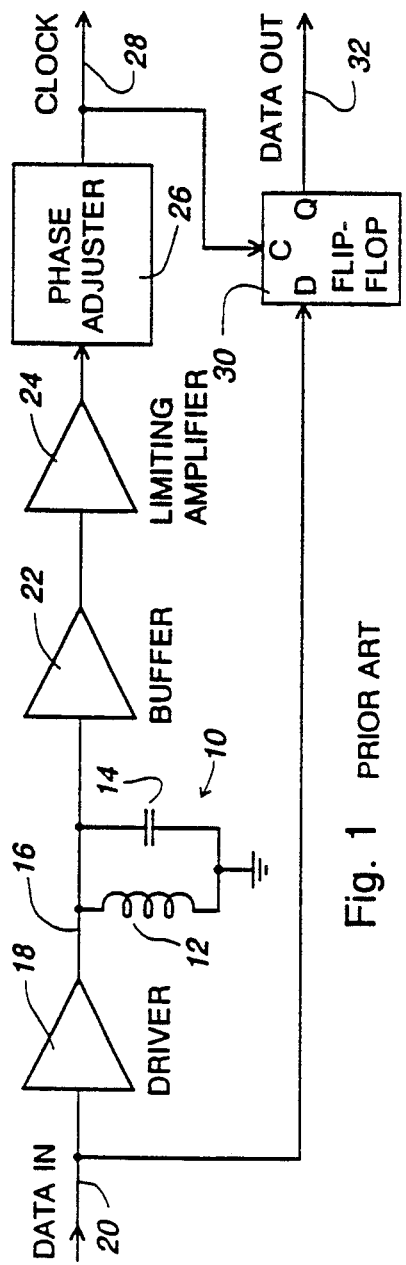
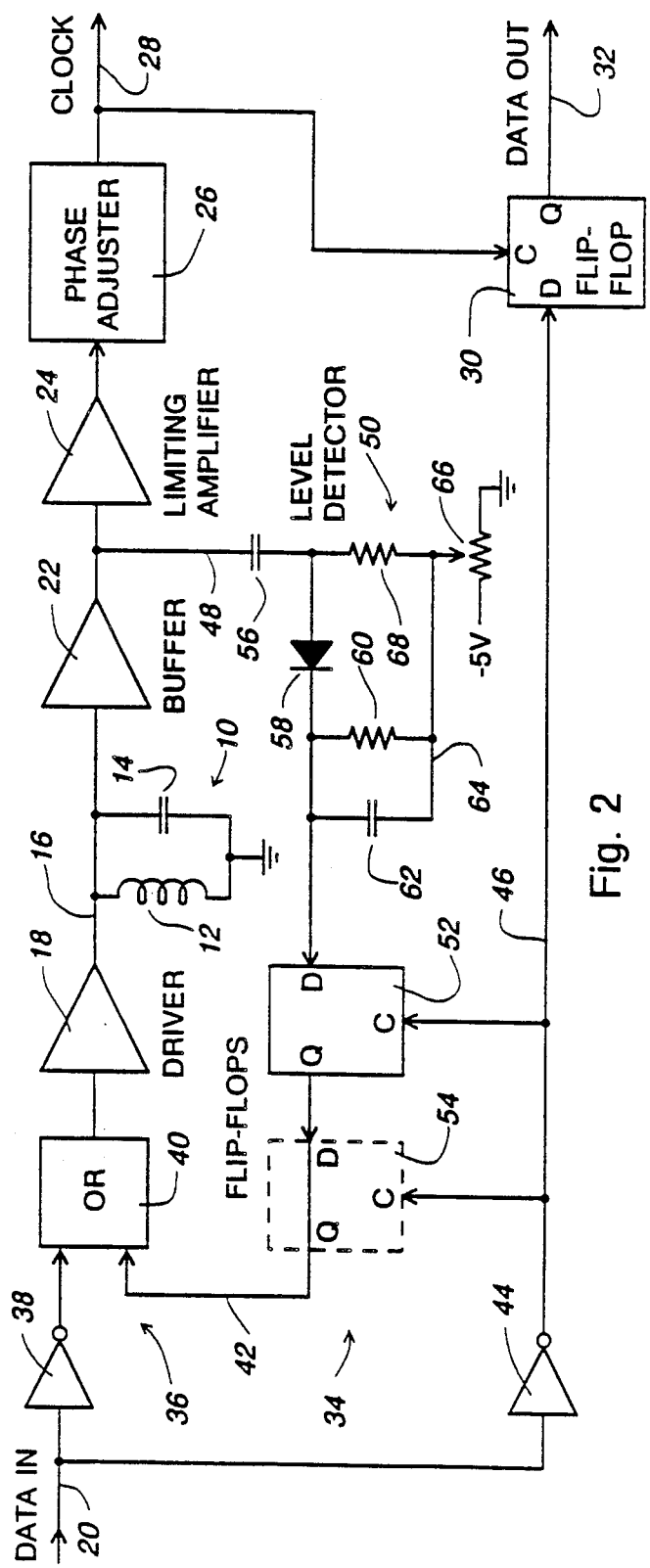
Fig. 1 PRIOR ART
Fig. 2

CLOCK RECOVERY CIRCUIT

This invention relates to clock recovery circuits.

It is well known to provide a clock recovery circuit for producing, from a received digital data signal for example in a digital transmission system, a clock signal which is used for timing purposes in processing the data signal. Typically the data signal is a serial binary signal having binary 1s and 0s represented respectively by the presence and absence of pulses, and the clock signal is produced at the bit rate of the data signal. Such a clock recovery circuit may for example comprise a resonant circuit which oscillates at the frequency of the clock signal, and from which the clock signal is derived, and which is driven by the pulses (binary 1s) in the data signal and has a sufficiently high Q that it continues to oscillate during binary 0s when no drive pulses occur. The Q must not be so high, however, that the circuitry is over driven by high densities of binary 1 pulses in the data signal.

In order to facilitate clock recovery, it is well known to encode the data in a manner to avoid periods of many clock cycles during which there are no drive pulses to the resonant circuit. Such encoding, for example using zero code suppression or data scrambling schemes, has the disadvantage of requiring increased processing of the data and/or increased bit rates. This disadvantage is particularly undesirable in the case of high data bit rates, for example of the order of 100 Mb/s or more, at which power dissipation considerations become significant, and at which CMOS logic circuitry can not operate and other forms of circuitry, such as emitter-coupled logic, must be used with consequently increased costs.

Accordingly, an object of this invention is to provide an improved clock recovery circuit, which can facilitate clock signal recovery from data which may contain relatively long sequences of zeroes and relatively long sequences of ones.

According to this invention there is provided a clock recovery circuit comprising: a resonant circuit for oscillation at a clock frequency; output means for deriving a clock signal from the resonant circuit; drive means responsive to a data signal for driving the resonant circuit; and inhibit means for inhibiting the drive to the resonant circuit in dependence upon an oscillation amplitude of the resonant circuit.

In such a clock recovery circuit, the resonant circuit can have a high Q, so that its oscillation is sustained at a sufficiently high amplitude to maintain the clock signal during long sequences of consecutive binary 0s during which there is no drive to the resonant circuit. To prevent the dynamic range of the drive means and/or the output means from being exceeded when there is a high density of binary 1s in the incoming data signal, the inhibit means inhibits the drive to the resonant circuit in dependence upon its oscillation amplitude, for example when this exceeds a threshold level.

The inhibit means preferably comprises level detecting means for detecting a level of the oscillation amplitude of the resonant circuit; gating means for coupling the data signal to the drive means; and bistable means responsive to the level detecting means for inhibiting the gating means in response to the detected level of the oscillation amplitude of the resonant circuit exceeding a threshold level.

In order to avoid jitter in the recovered clock signal, the bistable means is preferably responsive to the data signal for changing its state in dependence upon an output of the level detecting means, whereby pulses of the data signal produced at an output of the gating means have a constant width or duration. In this respect the propagation delay through the bistable means and the gating means is made less than the minimum interval between consecutive binary 1 pulses in the data signal.

In order to avoid possible adverse states of the bistable means, the circuit may include a second bistable means coupled between the bistable means and the gating means and responsive to the data signal for changing its state.

The output means conveniently includes a buffer coupled between the resonant circuit and the level detecting means, to prevent damping of the resonant circuit by the level detecting means.

The invention will be further understood from the following description with reference to the accompanying drawing, in which:

FIG. 1 schematically illustrates a known form of clock recovery circuit; and

FIG. 2 schematically illustrates a clock recovery circuit in accordance with an embodiment of the invention.

Referring to FIG. 1, a known clock recovery circuit includes a tank or resonant circuit 10, comprising an inductor 12 and a capacitor 14 coupled in parallel, connected between an output line 16 of a driver stage 18 and ground. The circuit 10 is tuned to a clock signal frequency which is equal to the bit rate of incoming data supplied via a line 20 to an input of the driver stage 18. The incoming data on the line 20 comprises a serial bit stream in RZ (return-to-zero) form in which binary 1s are represented by pulses and binary 0s are represented by the absence of pulses in respective bit periods. The circuit 10 is driven into oscillation by the binary 1 pulses, and its Q is sufficiently high to sustain oscillation during the binary 0s.

The clock recovery circuit further comprises a buffer 22, a limiting amplifier 24, and a phase adjuster 26, connected in this sequence between the line 16 and an output line 28 for a recovered clock signal, and a data latch 30 which is constituted by a D flip-flop having a data input D connected to the incoming data line 20, a clock input C connected to the clock signal output line 28, and an output Q connected to a data output line 32. The buffer 22 has a high input impedance to provide low damping for the resonant circuit 10, and the limiting amplifier 24 converts the substantially sinusoidal output signal of the buffer 22 into a substantially square waveform. The phase adjuster 26 provides a desired phase delay for general synchronism of the clock signal on the line 28 to the incoming data on the line 20, and the data latch 30 provides for accurate retiming of the data.

In such a known clock recovery circuit, the buffer 22 and limiting amplifier 24 operate well only with oscillation signal amplitudes within a limited range, typically from several tenths of a volt to a few volts. Accordingly, the nature of the incoming data signal must be such that the resonant circuit 10 oscillates with amplitudes which are always within this range. This imposes undesired restraints on the data signal, such as the maximum number of consecutive 0s and the average density of binary 1s which can be accommodated.

Furthermore, the oscillation amplitude is also dependent upon component tolerances, temperature changes, and the pulse width of the pulses which drive the resonant circuit 10; these impose further restrictions on the operation and usefulness of such a known clock recovery circuit.

Referring now to FIG. 2, a clock recovery circuit in accordance with an embodiment of this invention includes the same components as the circuit of FIG. 1, which are accordingly given the same references, and additionally comprises a feedback circuit 34 and gating means 36.

In this embodiment of the invention, the gating means 36 comprises an inverter 38 and an OR gating function 40 coupled in series between the incoming data line 20 and the input of the driver stage 18, with an output of the feedback circuit 34 being connected via a line 42 to a second input of the OR gating function 40. With a data bit rate of the order of 100 Mb/s or more, the inverter 38 is conveniently an ECL (emitter-coupled logic) inverter, in which case the OR gating function 40 is conveniently constituted by a wired-OR connection.

As the inverter 38 introduces a small delay in the signal path to the driver stage 18, a second, similar, inverter 44 is connected to provide a thermally matched compensating delay between the incoming data line 20 and a line 46 connected to the data input D of the data latch 30. (The line 46 can not instead be connected to the output of the inverter 38 if a wired-OR connection is used.)

The feedback circuit 34 has an input connected via a line 48 to the output of the buffer 22, and comprises a level detector 50 and at least one flip-flop 52; a second flip-flop 54 may optionally be provided as shown in broken lines in FIG. 2 and as described further below. The flip-flop 52 has a data input D connected to an output of the level detector 50, a clock input C connected to the line 46, and an output Q connected, in the absence of the second flip-flop 54, to the line 42. If the second flip-flop 54 is present, its data input D, clock input C, and output Q are connected respectively to the output Q of the flip-flop 52, the line 46, and the line 42.

The level detector 50 comprises a coupling capacitor 56 and a rectifying diode 58 connected in series between the line 48 and the data input D of the flip-flop 52, with a resistor 60 and a capacitor 62 connected in parallel between this data input D and a line 64 which is set to be at a desired reference potential by a potentiometer 66, with a resistor 68 connected between this line 64 and the junction between the capacitor 56 and the diode 58. The level detector 50 is designed to track the oscillation amplitude of the resonant circuit 10, as it appears at the output of the buffer 22; to this end the charging time constant of the capacitor 62 is arranged to be short relative to the rate of buildup of the oscillation amplitude, and the discharge time constant of the capacitor 62 via the resistor 60 is arranged to be less than the decay time constant of the resonant circuit 10.

The operation of the clock recovery circuit of FIG. 2 is described below, assuming that the flip-flop 54 is not present and that initially the flip-flop 52 is reset, with the resonant circuit 10 oscillation amplitude being sufficiently small that the level detector 50 produces a low voltage which is interpreted as a binary 0 at the data input D of the flip-flop 52.

Binary 1 pulses which occur in the incoming data on the line 20 are propagated through the gating means 36 to cause the resonant circuit to ring or oscillate with an increasing amplitude (assuming a sufficient density of binary 1 pulses). Consequently the capacitor 62 in the level detector 50 is charged and the output voltage of the level detector increases, until this voltage exceeds a threshold level at which it is interpreted at the data input D of the flip-flop 52 as a binary 1, causing the flip-flop 52 to be set on the next rising edge of the data signal on the line 46, which is supplied as a clock input to the flip-flop 52.

The consequent binary 1 on the line 42 blocks subsequent pulses from being propagated through the OR function 40, so that the oscillating amplitude of the resonant circuit 10 decays gradually, until the level detector 50 again produces an output voltage which is sufficiently low that it is interpreted as a binary 0 by the flip-flop 52 data input D. Then again, on the next rising edge of a binary 1 pulse appearing on the line 46, the flip-flop 52 is reset to allow subsequent binary 1 pulses to propagate through the gating means 36 to drive the resonant circuit 10.

Thus the feedback circuit 34 and gating means 36 serve to selectively inhibit the application of pulses driving the resonant circuit in dependence upon the oscillation amplitude. In this manner, even in the presence of long sequences of binary 1 pulses in the incoming data, which in the prior art clock recovery circuit can cause errors due to the oscillation amplitude increasing to beyond the dynamic range of one or more of the driver 18, buffer 22, and limiting amplifier 24, the circuit of FIG. 2 maintains the oscillation amplitude within a desired range for error-free operation.

In order to avoid the generation of variable-duration pulses or glitches at the output of the OR gating function 40, which would have the effect of changing the phase of the oscillation and consequently producing jitter in the recovered clock signal on the line 28, the propagation delay from the clock input of the flip-flop 52 (or the flip-flop 54 if this is present) to the input of the OR gating function 40 must be less than the interval between consecutive binary 1 pulses. This ensures that binary 1 pulses are either completely blocked or completely passed by the gating means 36, and are not partially blocked and partially passed. Consequently, pulses produced at the output of the gating means 36 all have the same pulse width or duration.

As the output voltage of the level detector 50, and hence the interpreted logic level at the data input D of the flip-flop 52, varies asynchronously with respect to the pulse edges on the line 46, it is conceivable that in operation of the circuit of FIG. 2 as described above the data set-up or hold time of the flip-flop 52 may not be satisfied, causing the flip-flop 52 to change state very slowly, or to start to change state and then revert to its previous state. To avoid the generation of errors in such instances, the second flip-flop 54 may be optionally provided, connected as described above. The provision of this second flip-flop 54, however, also has the effect of delaying the action of the feedback circuit 34, in that two binary 1 pulses must occur to propagate the logic level at the data input D of the flip-flop 52 to the line 42 through the two flip-flops 52 and 54, compared with only one binary 1 pulse being required if only the flip-flop 52 is present.

A clock recovery circuit as described above with reference to FIG. 2 has been found to be particularly effective in a digital television signal distribution arrangement for a residence, in which the data has a bit rate greater than 200 Mb/s and is constituted by bit interleaving two digital television signals. Eight-bit words of each such signal can have any one of $2^8 - 1 = 255$ values, the all-zeroes 8-bit word being excluded so that each 8-bit word always includes at least one binary 1. This ensures a minimum average 1s density of 1 in 8; i.e. on average there is at least 1 binary 1 bit in every 8 bits of the data, with a maximum of 8 binary 1s in 8 bits. This variation in 1s density in the data would produce an excessive variation, over at least an 8:1 range, in the oscillation amplitude of the prior art circuit of FIG. 1, but can be easily accommodated by the circuit of FIG. 2. With such data, the incoming data signal can in the worst case comprise a sequence of 28 consecutive binary 0s, i.e. the consecutive 8-bit words 10000000 and 00000001 occurring for both bit-interleaved digital television signals, resulting in the sequence 1100000000000000000000000000011 in the incoming data on the line 20. Again, the circuit of FIG. 2 can accommodate such a data bit sequence.

Although particular embodiments of the invention have been described in detail, it should be appreciated that numerous variations, modifications, and adaptations may be made without departing from the scope of the invention as defined in the claims. For example, the buffer 22, limiting amplifier 24, phase adjuster 26, data latch 30, and inverter 44 are not essential to the invention and any of these may be dispensed with in particular circumstances, and other forms of feedback circuit and gating means may be provided to achieve substantially the same effect as described above.

What is claimed is:

1. A clock recovery circuit comprising:
   a resonant circuit for oscillation at a clock frequency;
   output means, coupled to the resonant circuit for deriving a clock signal from the resonant circuit;
   drive means coupled to the resonant circuit responsive to a data signal for driving the resonant circuit; and
   inhibit means, coupled between the output means and the drive means, for inhibiting the drive to the resonant circuit in dependence upon an oscillation amplitude of the resonant circuit.

2. A clock recovery circuit as claimed in claim 1 wherein the inhibit means is responsive to the oscillation amplitude of the resonant circuit exceeding a threshold level for inhibiting the drive to the resonant circuit.

3. A clock recovery circuit as claimed in claim 1 wherein the inhibit means comprises:
   level detecting means for detecting a level of the oscillation amplitude of the resonant circuit;
   gating means for coupling the data signal to the drive means; and
   bistable means responsive to the level detecting means for inhibiting the gating means in response to the detected level of the oscillation amplitude of the resonant circuit exceeding a threshold level.

4. A clock recovery circuit as claimed in claim 3 wherein the bistable means is responsive to the data signal for changing its state in dependence upon an output of the level detecting means, whereby pulses of the data signal produced at an output of the gating means have a constant width.

5. A clock recovery circuit as claimed in claim 4 and including a second bistable means coupled between the bistable means and the gating means and responsive to the data signal for changing its state.

6. A clock recovery circuit as claimed in claim 3 wherein the output means includes a buffer coupled between the resonant circuit and the level detecting means.

* * * * *